United States Patent
Park et al.

(10) Patent No.: US 7,802,054 B2
(45) Date of Patent: Sep. 21, 2010

(54) APPARATUS AND METHODS USING INVALIDITY INDICATORS FOR BUFFERED MEMORY

(75) Inventors: Chan-Ik Park, Seoul (KR); Sang Lyul Min, Seoul (KR); Tae-Sung Jung, Seoul (KR); Kyun-Ho Kook, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 632 days.

(21) Appl. No.: 11/230,994

(22) Filed: Sep. 20, 2005

(65) Prior Publication Data

US 2006/0136676 A1 Jun. 22, 2006

(30) Foreign Application Priority Data

Dec. 21, 2004 (KR) .................. 10-2004-0109826

(51) Int. Cl.
*G06F 12/00* (2006.01)

(52) U.S. Cl. .................. 711/117; 711/118; 711/144; 711/156; 711/202; 711/E12.016; 711/E12.068

(58) Field of Classification Search .................. None
See application file for complete search history.

(56) References Cited

U.S. PATENT DOCUMENTS

| | | | |
|---|---|---|---|
| 4,433,374 A * | 2/1984 | Hanson et al. .............. 711/138 |
| 5,530,828 A | 6/1996 | Kaki et al. |
| 5,561,823 A | 10/1996 | Anderson |
| 5,594,926 A | 1/1997 | Chang et al. |
| 5,696,929 A | 12/1997 | Hasbun et al. |
| 5,802,344 A | 9/1998 | Menon et al. |
| 5,809,515 A | 9/1998 | Kaki et al. |
| 5,907,716 A | 5/1999 | Yoshimura |
| 6,134,610 A | 10/2000 | Chung |
| 6,219,752 B1 | 4/2001 | Sekido |
| 6,233,648 B1 | 5/2001 | Tomita |
| 6,272,589 B1 | 8/2001 | Aoki |
| 6,321,318 B1 * | 11/2001 | Baltz et al. .................. 711/170 |

(Continued)

FOREIGN PATENT DOCUMENTS

JP 06-131123 5/1994

(Continued)

OTHER PUBLICATIONS

Jim Handy, The Cache Memory Book 1998, Academic Press, 2nd edition, pp. 16, 47-48.*

(Continued)

*Primary Examiner*—Reginald G Bragdon
*Assistant Examiner*—Shawn X Gu
(74) *Attorney, Agent, or Firm*—Volentine & Whitt, PLLC

(57) ABSTRACT

A storage system includes a storage medium configured to store data and a buffer memory configured to buffer data to be written to the storage medium. The storage system further includes a controller configured to selectively transfer the buffered data to the storage medium responsive to an invalidity indicator received from an external source. For example, the invalidity indicator may comprise unwrite information received from an external source, e.g., information that indicates that selected buffered data corresponds to deleted file data.

12 Claims, 8 Drawing Sheets

U.S. PATENT DOCUMENTS

| | | |
|---|---|---|
| 6,473,835 B2 | 10/2002 | Luick |
| 6,601,147 B1 | 7/2003 | Bealkowski et al. |
| 6,675,276 B2 * | 1/2004 | Schulze et al. ............. 711/200 |
| 6,708,251 B1 | 3/2004 | Boyle et al. |
| 6,728,826 B2 | 4/2004 | Kaki et al. |
| 6,910,107 B1 * | 6/2005 | Boucher ................... 711/141 |
| 7,113,402 B2 | 9/2006 | Rutledge et al. |
| 2003/0202383 A1 | 10/2003 | Shiota et al. |
| 2005/0246701 A1 * | 11/2005 | Kanapathipillai et al. ... 717/168 |
| 2006/0136676 A1 | 6/2006 | Park et al. |

FOREIGN PATENT DOCUMENTS

| | | |
|---|---|---|
| JP | 2002-269065 | 9/2002 |
| JP | 2003-015928 A | 1/2003 |
| JP | 2003-199014 | 7/2003 |
| KR | 1990-0003744 | 3/1990 |
| KR | 1020010077401 A | 8/2001 |
| KR | 1020040013854 A | 2/2004 |
| KR | 100578143 B1 | 5/2006 |
| TW | 591510 | 6/2004 |
| WO | WO 02/17084 A2 | 2/2002 |

OTHER PUBLICATIONS

Office Action, Chinese Application No. 200510131612.5, Aug. 22, 2008.

* cited by examiner

Fig. 4A

| | BBN | DCN | WSI |
|---|---|---|---|
| File1 | 0 | 3 | V |
| | 1 | 4 | V |
| | 2 | 5 | V |
| File2 | 3 | 8 | V |
| | 4 | 9 | V |
| | 5 | 10 | V |
| File3 | 6 | 18 | V |
| | 7 | 19 | V |
| | 8 | 20 | V |
| | 9 | 21 | V |
| | 10 | 23 | V |

| M-1 | | |
|---|---|---|
| M | | |

Fig. 4B

| | BBN | DCN | WSI |
|---|---|---|---|
| File1 | 0 | 3 | V |
| | 1 | 4 | V |
| | 2 | 5 | V |
| File2 | 3 | 8 | X |
| | 4 | 9 | X |
| | 5 | 10 | X |
| File3 | 6 | 18 | V |
| | 7 | 19 | V |
| | 8 | 20 | V |
| | 9 | 21 | V |
| | 10 | 23 | V |

| M-1 | | |
|---|---|---|
| M | | |

# APPARATUS AND METHODS USING INVALIDITY INDICATORS FOR BUFFERED MEMORY

CROSS-REFERENCE TO RELATED APPLICATION

The present application claims the benefit of Korean Patent Application No. 2004-109826, filed Dec. 21, 2004 and hereby incorporated by reference herein in its entirety.

BACKGROUND OF THE INVENTION

The present invention relates to computing systems and methods and, more particularly, to computing systems including a storage system with buffer memory.

FIG. 1 is a block diagram illustrating a generic computing system. The computing system includes a host 10, e.g., a host computer system, and storage 20. The host 10 includes a central processing unit (not shown) and a main memory (not shown). The storage 20 is connected to the host 10 using a standardized interface, such as a small computer system interconnect (SCSI) interface, an enhanced small device interface (ESDI), or an intelligent drive electronic (IDE) interface. The storage 20 includes a storage medium 22, such as a hard disk or a floppy disk, a buffer memory 24 and a controller 26. The controller 26 is connected to the storage medium 22 and the buffer memory using conventional interfaces. The buffer memory 24 includes memory, such as a static random access memory SRAM or a dynamic random access memory DRAM. The buffer memory 24 is used for improving a write performance of the storage 20.

FIG. 2 is a view showing exemplary file processing for the computing system shown in FIG. 1. When an application program is executed at a high level, such as at the host 10, the application program generates files and the generated files are managed by a file system such as a file allocation table (FAT) file system. If the application program writes data in the generated files, the written data is transmitted to lower level, such as the storage 20, under control of the central processing unit. The transmitted data is temporally stored in the buffer memory of the storage 20. When the host 10 requests a file, data of the requested file is directly transferred from the storage 20 to the main memory of the host 10 or the data of the requested file is transferred to the main memory of the host 10 through the buffer memory 24. Data transferred through the buffer memory 24 may be temporally stored in the buffer memory 24.

Because the capacity of the buffer memory 24 usually is small in comparison to the capacity of the storage medium 22, it typically is not possible to store all of data transferred from the main memory to the storage medium 22 in the buffer memory 24. Therefore, the data stored in the buffer memory 24 is intermittently transferred to the storage medium 22 under control of the controller 26. The transfer of data from the buffer memory 24 to the storage medium 22 typically is automatically performed without intervention of the host 10. For example, the data temporally stored in the buffer memory 24 may be automatically transferred to the storage medium 22 if the buffer memory 24 lacks room for storing new data when the host 10 requests to perform a write operation, or if the storage 20 is in an idle state wherein no requests are received from the host 10 within a predetermined time period.

The above-mentioned computing system may have disadvantages. When data of a file processed by an application program of the host 10 is deleted, the data is treated as the deleted file by the file system at the host 10. Even if the data is considered deleted at the level of the host 10, the data may actually still be stored in the buffer memory 24. The data stored in the buffer memory 24 may then be automatically transferred to the storage medium 22 without intervention of the host 10 when the buffer memory 24 lacks room for storing new data. Although the data stored in the buffer memory becomes invalid because of the deletion at the high level, the invalid data may be unnecessarily written in the storage medium 22 because the controller 26 typically cannot determine the validity of data stored in the buffer memory 24. Accordingly, write performance of the storage 20 may be degraded, and a life time of the storage 20 may be shortened due to the unnecessary write operations. In addition, power may be wasted by unnecessary write operations.

SUMMARY OF THE INVENTION

In some embodiments of the present invention, a storage system includes a storage medium configured to store data and a buffer memory configured to buffer data to be written to the storage medium. The storage system further includes a controller configured to selectively transfer the buffered data to the storage medium responsive to an invalidity indicator received from an external source. For example, the invalidity indicator may include unwrite information received from an external source, e.g., information that indicates that selected buffered data corresponds to deleted file data.

In further embodiments, the controller is configured to invalidate selected buffered data responsive to the invalidity indicator. In particular, the controller may be configured to store write state information indicative of invalidity of the invalidated buffered data responsive to the invalidity indicator, and to prevent transfer of the invalidated buffered data from the buffer memory to the storage medium responsive to the stored write state information.

In additional embodiments of the present invention, the controller is configured to trigger a transcribe operation responsive to a storage limitation in the buffer memory and/or an idle state of the storage medium. The transcribe operation includes transferring valid buffered data from the buffer memory to the storage medium controller while foregoing transfer of the invalidated buffered data from the buffer memory to the storage medium. According to further embodiments, the controller may be further configured to enable reuse of storage space in the buffer memory occupied by the invalidated buffered data responsive to the invalidation of the invalidated buffered data.

In certain embodiments of the present invention, a computing system includes a storage system including a storage medium configured to store data, a buffer memory configured to buffer data to be written to the storage medium and a controller configured to selectively transfer the buffered data to the storage medium responsive to an invalidity indicator. The computing system further includes a host configured to transfer the data to the buffer memory and to provide the invalidity indicator to the storage system responsive to a data modification operation at the host. The invalidity indicator may include, for example, an unwrite command generated responsive to deletion of file data at the host.

In further embodiments of the present invention, methods are provided for operating a storage system including a storage medium and a buffer memory configured to store data to be written to the storage medium. A invalidity indicator related to data stored in the buffer memory is received from an external source, such as a computer host. Data stored in the buffer memory is selectively transferred to the storage medium responsive to the received invalidity indicator.

According to some embodiments of the present invention, a system for controlling data storage in a storage medium includes a buffer memory configured to buffer data to be written to the storage medium, and a controller configured to selectively transfer the buffered data to the storage medium responsive to an invalidity indicator received from an external source.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A and 4B are diagrams showing a mapping table of a storage system in accordance with further embodiments of the present invention;

DETAILED DESCRIPTION OF EXEMPLARY EMBODIMENTS

Figure 1:
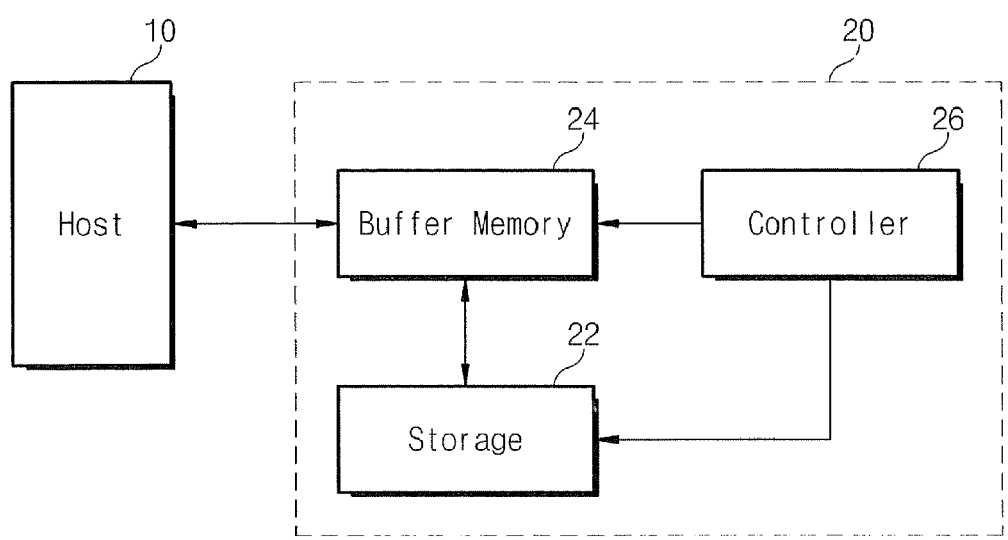
FIG. 1 is a block diagram illustrating a conventional computer system.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "includes," "including" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present specification and will not be interpreted in an idealized or overly formal sense unless expressly so defined herein.

It will be understood that although the terms first and second are used herein to describe various elements, these elements should not be limited by these terms. These terms are only used to distinguish one element from another element. Thus a first item could be termed a second item, and similarly, a second item may be termed a first item without departing from the teachings of the present invention. As used herein, the term "and/or" includes any and all combinations of one or more of the associated listed items. The symbol "/" may also used as a shorthand notation for "and/or".

In the present invention, an "unwrite." "erase" or "delete" command, request or information represents a command or other information input to a storage system to invalidate data stored in a buffer memory and prevent its transfer from the buffer memory to a storage medium. A transfer of data from a buffer memory to a storage medium may be referred to as a "transcribe" or "flushing" operation.

Figure 3:
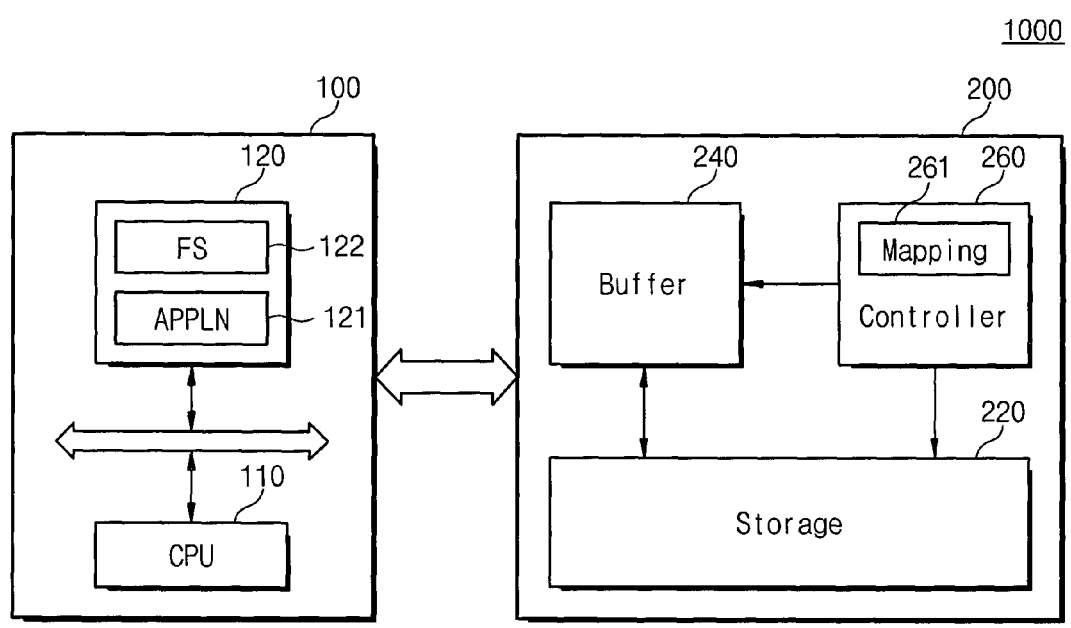
FIG. 3 is a block diagram illustrating a computing system including a storage system in accordance with some embodiments of the present invention.

FIG. 3 is a block diagram illustrating a computing system 1000 in accordance with some embodiments of the present invention. The computing system 1000 includes a host system 100 and a storage system 200. The storage system 200 may include, for example, a storage device coupled to the host system 100 using a standardized interface, such as a SCSI, ESDI, or IDE interface. It will be appreciated that other types of interfaces, including nonstandard interfaces, may be used to couple the host system 100 and the storage system 200. The storage system 200 may include memory integrated with the host system 100.

The host system 100 includes a central processing unit (CPU) 110 and a memory 120. The memory 120 may include a main memory of the host system 100. An application program 121 and a file system 122 are embodied in the memory 120. The file system 122 may include one or more file systems having a file allocation table (FAT) or other file system.

The host system 100 outputs an unwrite command to the storage system 200 when all or some of the data of a file processed by the application program 121 is to be deleted. The host system 100 may, for example, transmit the unwrite command accompanied by information relating to an address and/or size of the data to be deleted to the storage system 200.

Figure 2:
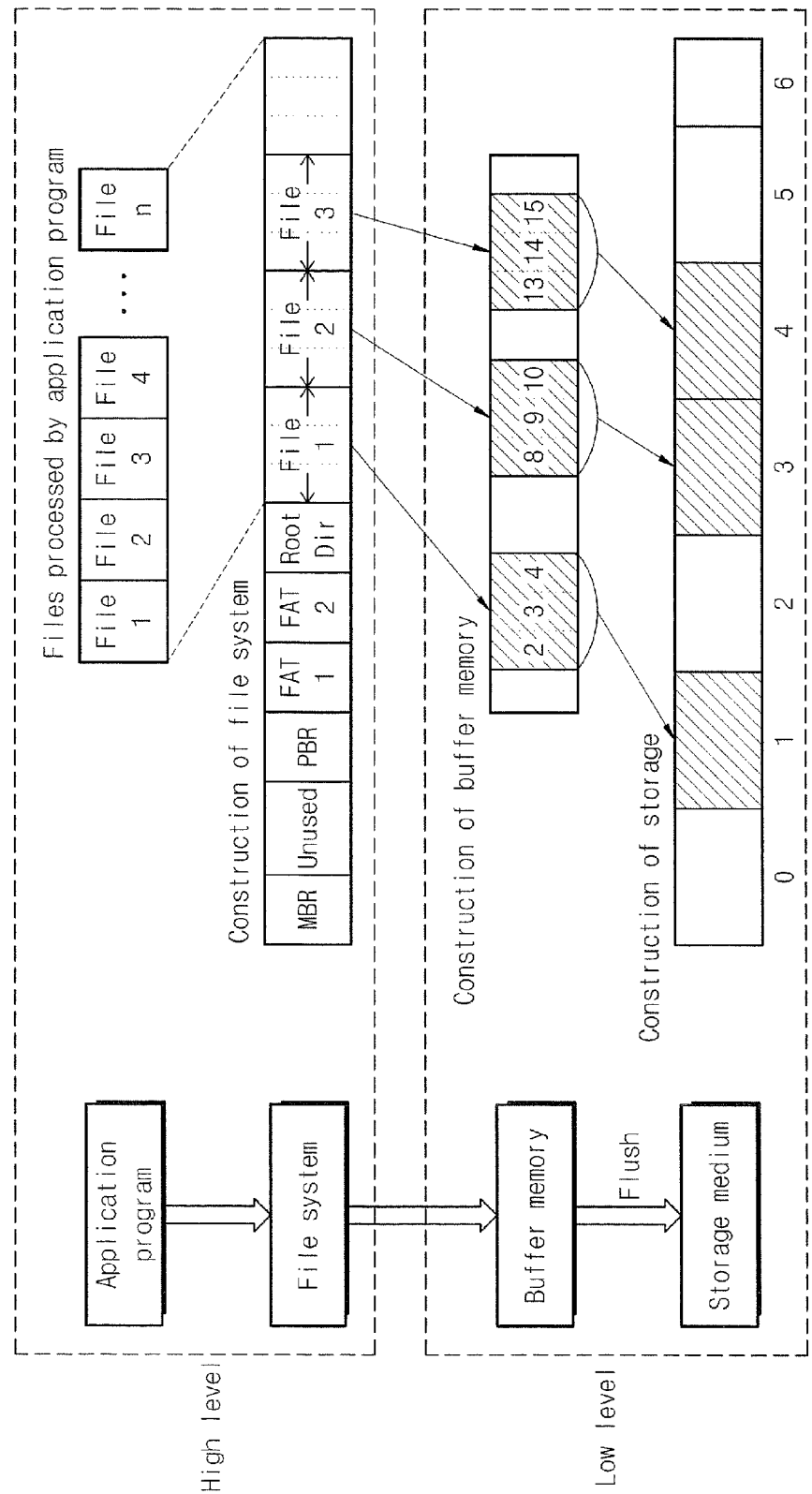
FIG. 2 illustrates conventional file processing operations of the computing system shown in FIG. 1.

A FAT file system, such as that shown in FIG. 2, may include a master boot record (MBR), a partition boot record (PBR), first and second file allocation tables (primary FAT, copy FAT) and a root directory. The data stored or to be stored in the storage system 200 can, for example, be identified using two items of information, such as a file name including the data and a path of a directory tree for reaching a place where the file is stored. Each entry of a directory stores information, such as a length of file (e.g. 32 bytes long), a file name, an extension name, a file property byte, a last modification date and time, a file size and a connection of a start-up cluster.

A predetermined character may be used as a first character of a file name to indicate a deleted file. For example, a hexadecimal number byte code E5h may be assigned to the first character of the file name for a deleted file to serve as a tag for indicating that the file is deleted. When a file is deleted, the CPU 110 may assign a predetermined character as the first character of the file name of the deleted file and also output an unwrite command and/or other invalidity information corresponding to the deleted file to the storage system 200.

Still referring to FIG. 3, the storage system 200 includes a storage medium 220, a buffer memory 240 and a controller 260. The storage system 200 prevents writing of data stored in the buffer memory 220 to the storage medium 260 when the data of a file is considered deleted at a higher level of the storage system 200 and an invalidity indicator has been input to the storage system 200. The invalidity indicator may include the unwrite command, along with information about an address and a size of the deleted data.

The storage medium 220 may store all types of data, such as text, images, music and programs. The storage medium 220 may be a nonvolatile memory, such as a magnetic disk or a flash memory. However, it will be understood that the storage medium 220 is not limited to nonvolatile memory.

The buffer memory 240 is used to buffer data transfer between the host system 100 and storage medium 220. The buffer memory 240 may include high speed volatile memory, such as dynamic random access memory (DRAM) or static random access memory (SRAM), and/or nonvolatile memory, such as magnetoresistive random access memory (MRAM), parameter random access memory (PRAM), ferroelectric random access memory (FRAM), NAND flash memory or NOR flash memory.

The buffer memory 240 serves as a write buffer. For example, the buffer memory 240 may temporarily store data to be written in the storage medium 220 responsive to a request of the host system 100. The write buffer function of the buffer memory 240 can be selectively used. Occasionally, in a "write bypass" operation, data transferred from the host system may be directly transferred to the storage medium 220 without being stored in the buffet memory 240. The buffer memory 240 may also work as a read buffer. For example, the buffer memory 240 may temporarily store data read from the storage medium 220. Although FIG. 3 shows only one buffer memory, two or more buffer memories can be provided. In such embodiments, each buffer memory may be used exclusively as a write buffer or read buffer, or may serve as a write and read buffer.

The controller 260 controls the storage medium 220 and the buffer memory 240. When a read command is input from the host system 100, the controller 260 controls the storage medium 220 to cause transfer of data stored in the storage medium 220 directly to the host system 100 or to cause transfer of data stored in the storage medium 220 to the host system 100 via the buffer memory 240. When a write command is input from the host system 100, the controller 240 temporarily stores data related to the write command in the buffer memory 240. All or part of the data stored in the buffer memory 240 is transferred to the storage medium 220 when the buffer memory 240 lacks room for storing additional data or when the storage system 200 is idle. The storage system 200 may be considered idle when no requests have been received from the host system 100 within a predetermined time.

The controller 260 holds address mapping information for the storage medium 220 and the buffer memory 240 and a mapping table 261 for storing write state information representing validity/invalidity of stored data. The write state information is updated by invalidity information (e.g., an indicator) provided from an external device. The controller 260 controls the storage medium 220 and the buffer memory 240 to write all or part of data stored in the buffer memory 240 to the storage medium 220 based on the write state information in the mapping table 261. In some embodiments of the present invention, the storage medium 220 and the buffer memory 240 may be embodied using a flash memory.

As described above, the storage system 200 of the illustrated embodiments of the present invention determines whether or not to transfer all or part of data stored in the buffer memory 240 to the storage medium 220 by referring to the write state information. That is, the storage system 200 of the present invention receives the unwrite or other information representing that data stored in the buffer memory is invalid data from an external source device, such as the host system 100. In response to the unwrite or other invalidity indicator, the storage system 200 prevents writing of invalid data to the storage medium 220 from the buffer memory 240. In other words, the storage system 200 assigns a tag representing invalidity of data stored in the buffer memory 240 and selectively transfers data stored in the buffer memory 240 to the storage medium 220 based on the assigned tag. Accordingly, a write performance of the storage system 200 may be improved, which can reduce shortening of the life time of the storage system 200 caused by unnecessary write operations. Furthermore, power consumed by unnecessary write operations may be reduced.

FIGS. 4A and 4B are diagrams showing exemplary mapping tables which may be used by the controller 260 of FIG. 3 according to some embodiments of the present invention. In FIGS. 4A and 4B, "BBN" represents a block number of the buffer memory 240, "DCN" represents a cluster number of the storage medium 220, and "WSI" represents the write state information indicating whether the data stored in the buffer memory 240 is a valid or invalid. In the illustrated embodiments, it is assumed that the block size of the buffer memory 240 is identical to a size of a cluster having a plurality of sectors. However, the storage medium 220 need not be limited to this assumption. For example, an allocation unit of the storage medium 220 can correspond to a sector of a magnetic disc, or a page, sector or block of flash memory. In the FIGS. 4A and 4B, invalid data is indicated by an "X" and valid data is indicated by a "V".

In FIG. 4A, it is also assumed that data sets FILE1, FILE2, FILE3 corresponding to three files is stored in the buffer memory 240 as valid data. The data sets FILE1, FILE2, FILE3 may not be stored in the storage medium 220 yet. The stored file data sets FILE1, FILE2, FILE3 are transferred to the storage medium 220 when the buffer memory 140 lacks room for storing new data or when the storage medium 220 becomes idle, as described above. The controller 260 updates the write state information of the file data sets FILE1, FILE2, FILE3 stored in the buffer memory 240 according to invalidity information transferred from the host system 100. For example, the file data set FILE2 is deleted in the host system 100 and the host system 100 transmits invalidity information for the file data set FILE2 to the controller 260, the invalidity information indicating that the file data set FILE2 has been deleted at the host system 100. When the controller 260 receives the invalidity information for the file data set FILE2, the controller 260 changes the write state information WSI of the file data set FILE2 to "X" to indicate that the file data set FILE2 is invalid.

Figure 5:
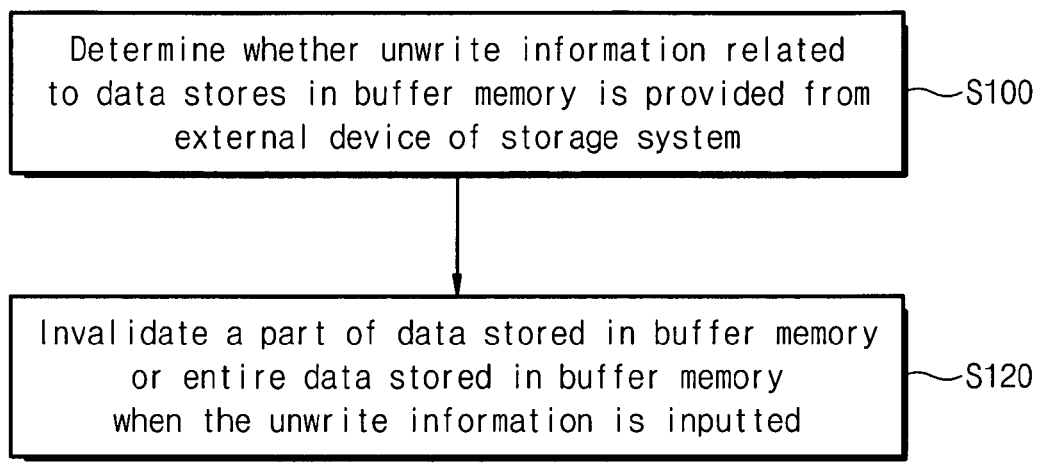
FIG. 5 is a flowchart illustrating exemplary operations for managing data stored in a storage system of a computing system in accordance with additional embodiments of the present invention.

FIG. 5 is a flowchart illustrating exemplary operations for managing data stored in a storage system in a computing system in accordance with some embodiments of the present invention. As mentioned above, a storage system 200 shown in FIG. 2 includes the storage medium 220 for storing data and the buffer memory 240 for temporally storing data to be written to the storage medium 220. As shown in FIG. 5, in a step S100, it is determined whether unwrite or other invalidity information is provided to the storage system 200. In a step S200, all or part of the corresponding data temporarily stored in the buffer memory 240 is marked invalid in response to the unwrite or other invalidity information. After invalidation, the invalid data is not written to the storage medium 220.

Figure 6A:
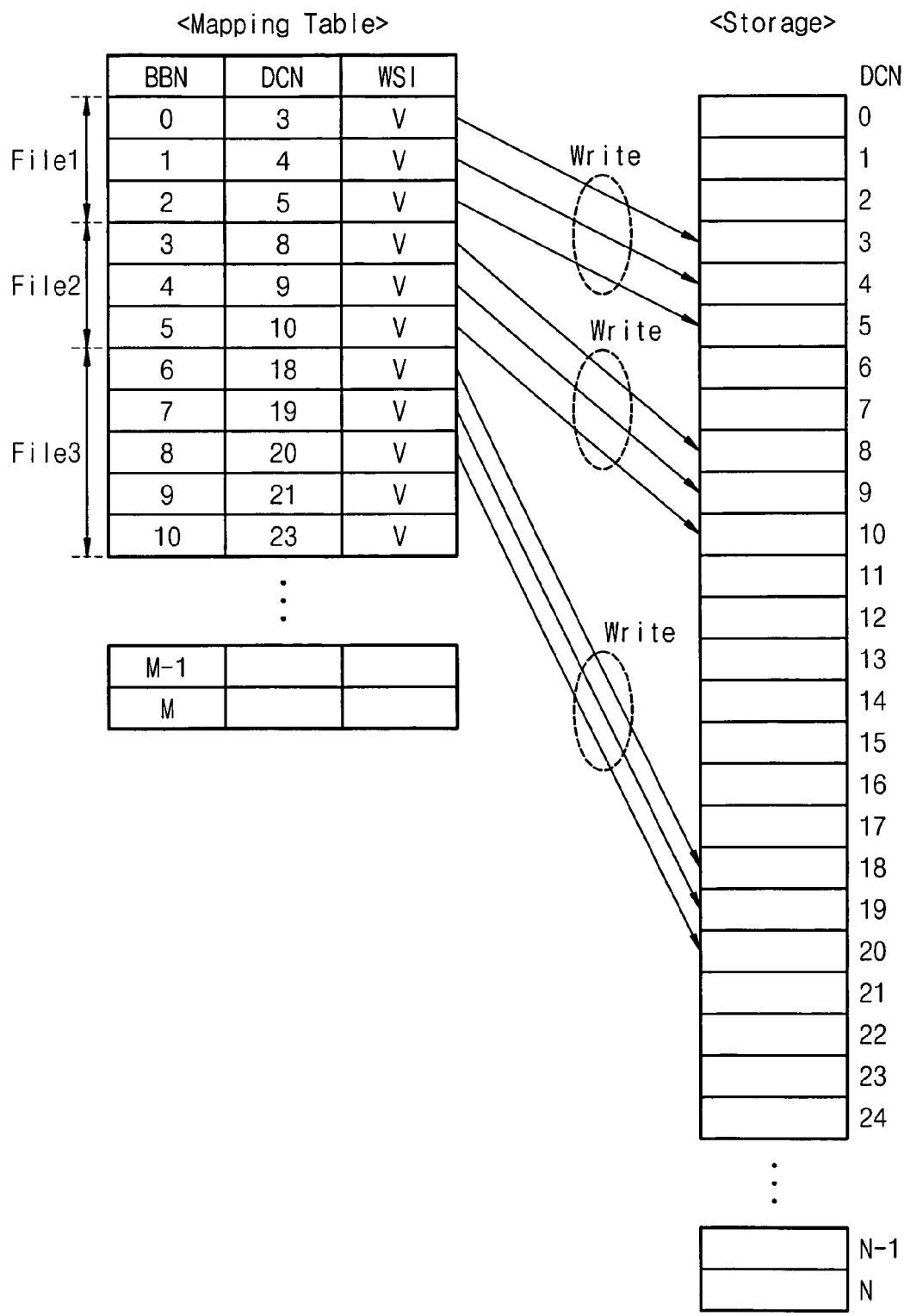
FIGS. 6A-6C are mapping diagrams illustrating exemplary write operations based on invalidity information for data stored in a buffer memory in a storage system of a computing system in accordance with still further embodiments of the present invention.
Figure 6B:
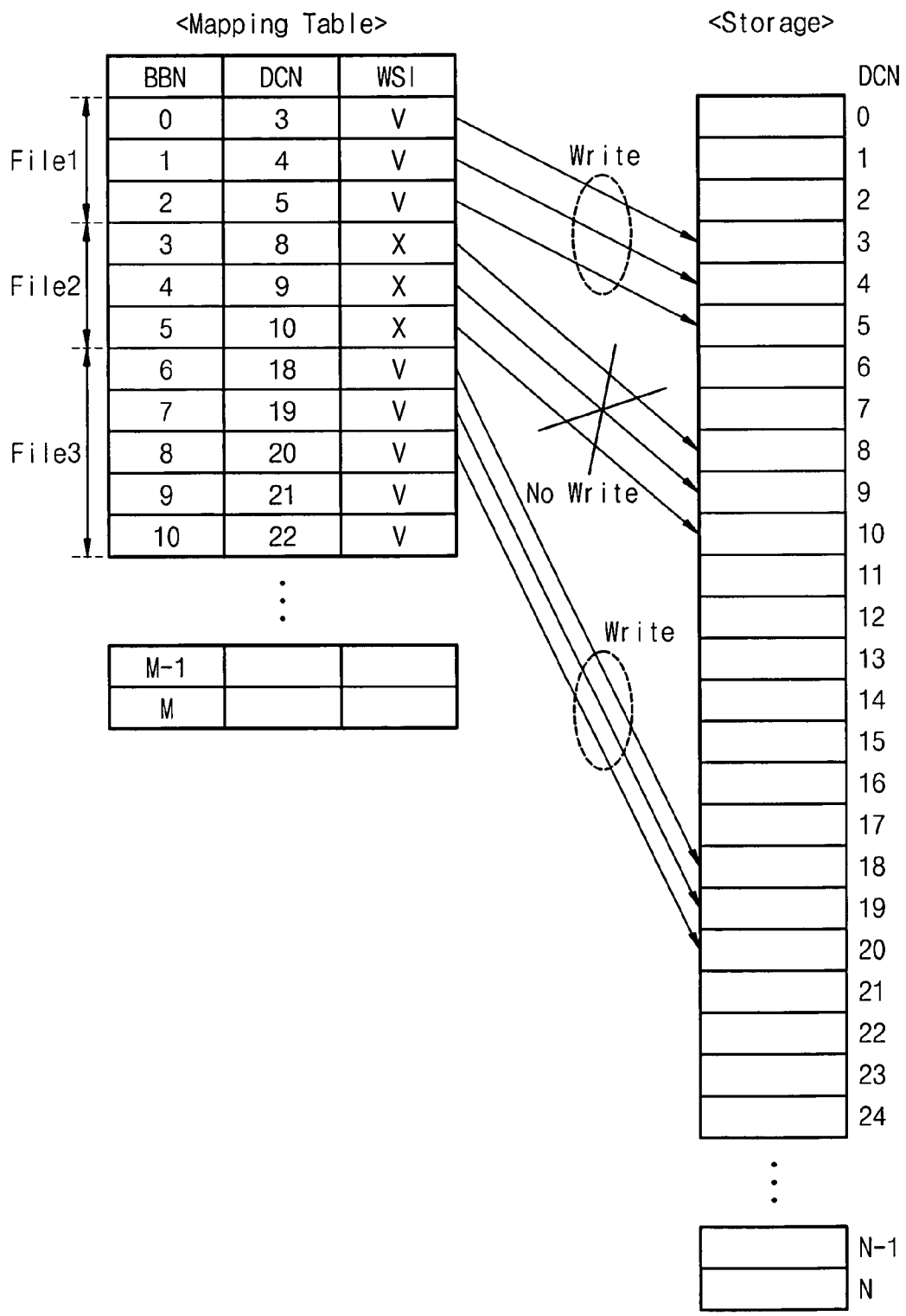
Figure 6C:
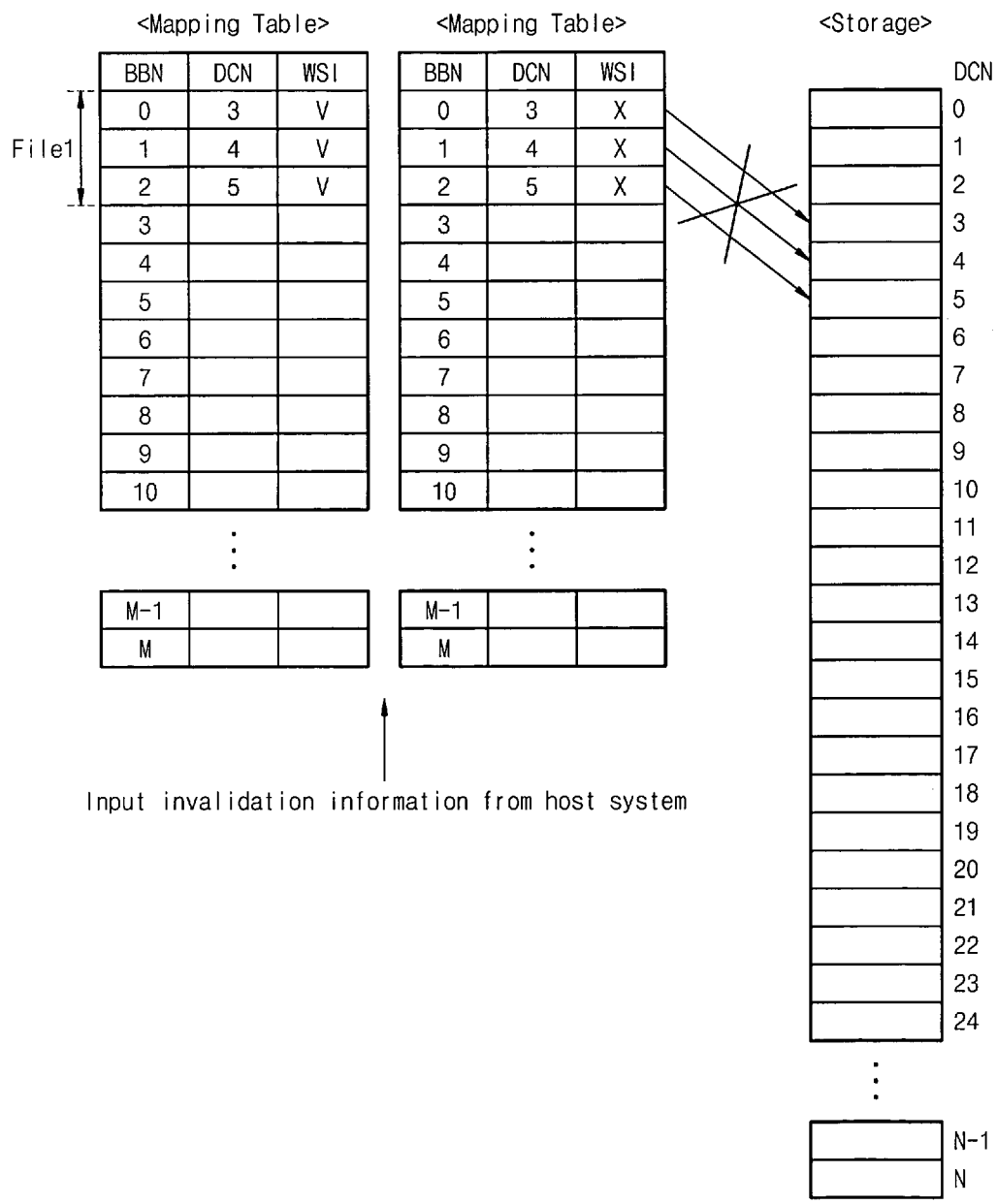

FIGS. 6A-6C are diagrams illustrating exemplary data management operations in accordance with further embodiments of the present invention. As described above with reference to FIG. 2, the controller 260 of the storage system 200 transfers data stored in the buffer memory 240 to the storage medium 220 by referring to the mapping table 261. Referring to FIG. 6A, it is assumed that there are three file data sets FILE1, FILE2, FILE3 stored in the buffer memory 240 as valid data. The controller 260 of the storage system 200 determines which data stored the buffer memory 240 is invalid based on the write state information WSI in the mapping table 261 that corresponds to the stored file data sets FILE1, FILE2, FILE3. As shown in FIG. 6A, the controller 260 controls the buffer memory 240 and the storage medium 220 to transfer the file data sets FILE1, FILE2, FILE3 from the buffer memory 240 to corresponding locations in the storage medium 220, as all of the file data sets FILE1 to FILE3 are tagged as being valid by the mapping table 261.

If invalidity information including, for example, an unwrite command, address information for the invalid data file and size information for the invalid data file, is input to the controller 260 before the transfer of corresponding data to the storage medium 220, the controller 260 invalidates data related to the invalidity information. For example, as shown in FIG. 6B, if the invalid data corresponds to the file data set FILE2, the controller 260 updates the write state information WSI of the mapping table 261 related to the file data set FILE2 to indicate that the file data set FILE2 is invalid. The controller 260 may then determine which data stored in the buffer memory 240 is invalid based on the write state information WSI in the mapping table 261. As shown in FIG. 6B, the file data FILE1 and FILE3 are tagged as valid data and the file data FILE2 is tagged as invalid data in the mapping table 261. Accordingly, the controller 260 controls the buffer memory 240 and the storage medium 220 to transfer the file data sets FILE1 and FILE3 to corresponding locations of the storage medium 220, while foregoing transfer the file data FILE2 to a corresponding location of the storage medium 220. Space in the buffer memory 240 occupied by the invalid file data set FILE2 may be used for storing new data in a subsequent new write/read operation.

In another example shown in FIG. 6C, it is assumed that only one data file set FILE1 is stored in the buffer memory 240. If invalidity information is input to the controller 260 before transfer of the data file set FILE1 to the storage medium 220, the controller 260 invalidates the data file set FILE1. In particular, the controller 260 updates the write state information WSI of the mapping table 261 related to the file data set FILE1 to show that the file data set FILE1 is invalid. After the updating, the controller 260 may then determine whether the data stored in the buffer memory 240 is invalid by referring to the write state information WSI of the mapping table 261 related to the file data FILE1. As shown in FIG. 6C, the file data set FILE1 is not transferred to the storage medium 220 because of the "X" state of the write state information WSI. Accordingly, transfer of invalid data is prevented when the storage medium 220 is idle. The space of the buffer memory 240 occupied by the invalid data may be used to store new data in a subsequent write operation.

Although the invalid data is written in the storage medium 220, files related to the invalid data stored in the storage medium 220 are not influenced by the stored invalid data. Furthermore, the controller 260 may selectively transfer the invalid data to the storage medium 220. That is, although the data stored in the buffer memory 240 is invalidated by the unwrite command, the controller 260 may selectively transfer the invalid data to the storage medium 220.

The storage system 200 described above controls data transfer operations between the buffer memory 240 and the storage medium 220 by referring to the mapping table including the write state information representing whether the data stored in the buffer memory 240 is invalid or valid. As described above, the write state information of the data may be provided from a source external to the storage system 200. Also, the data may be new data read and modified by the external source. It will be appreciated that storage systems according to various embodiments of the present invention may be used not only in computing systems, but also in devices that store data on a hard disk or in a flash memory, such as a MP3 player or other portable electronic device. By reducing transfer of invalid from a buffer memory to a storage medium, write performance and/or lifetime of the storage system can be improved. In addition, power consumption associated with unnecessary write operations can be reduced.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A storage system, comprising:
a non-volatile storage medium configured to store data;
an interface coupled to a host which includes a central processing unit and a main memory, wherein the interface receives write storage data and an invalidity information from the host, and transmits read storage data to the host in response to read requests received from the host;
a buffer memory which temporarily stores the write storage data received by the interface; and
a memory controller, which manages a mapping table containing write state information, and which updates the write state information contained in the mapping table according to invalidity information received by the interface, automatically executes a data transcribe operation without intervention of the host with reference to the updated write state information contained in the mapping table, and executes read operations in which the read storage data is transmitted to the host by the interface in response to the read requests received from the host;
wherein the mapping table maps a memory location of the buffer memory to a memory location of the non-volatile storage medium;
wherein the data transcribe operation includes transferring write storage data indicated as valid by the updated write state information from the buffer memory to a memory location in the non-volatile storage medium specified by the mapping table, and not transferring write storage data indicated as invalid by the updated write state information from the buffer memory to the memory location in the non-volatile storage medium specified by the mapping table; and
wherein, in the read data operations, the memory controller is responsive to each read request received from the host to read the read storage data from the non-volatile storage medium.

2. The storage system of claim 1, wherein the invalidity information comprises at least one of an unwrite command, address information for the write storage data indicated as invalid, and size information of the write storage data indicated as invalid.

3. The storage system of claim 1, wherein the memory controller is configured to automatically execute the transcribe operation responsive to at least one of a storage capacity limitation in the buffer memory and an idle state of the storage medium.

4. The storage system of claim 3, wherein the memory controller is further configured to store new write storage data received from the host in storage space of the buffer memory occupied by the write storage data indicated as invalid.

5. The storage system of claim 1, wherein the buffer memory comprises at least one of nonvolatile and volatile semiconductor memory, and wherein the non-volatile storage medium comprises at least one of nonvolatile semiconductor memory and a magnetic storage medium.

6. The storage system of claim 1, wherein the buffer memory is an input buffer memory, and wherein the storage system further comprises an output buffer memory which is separate from the input buffer memory.

7. A computing system comprising:
a host system comprising a central processing unit and a main memory, wherein the host system outputs write storage data, invalidity information and read requests, and receives read storage data; and
a storage system, operatively coupled to the host system, which receives the write storage data, the invalidity information and the read requests from the host system, and transmits the read storage data to the host system;
wherein the storage system comprises:
a non-volatile storage medium;
a buffer memory which temporarily stores the write storage data received from the host system; and
a memory controller, which includes a mapping table containing write state information, and which updates the write state information contained in the mapping table according to the invalidity information received from the host system, executes a data transcribe operation independently of the host system with reference to the updated write state information contained in the mapping table, and executes read data operations in which the read storage data is transmitted to the host system in response to the read requests received from the host system;
wherein the mapping table maps a memory location of the buffer memory to a memory location of the non-volatile storage medium;
wherein the data transcribe operation includes transferring write storage data indicated as valid by the updated write state information from the buffer memory to a memory location in the non-volatile storage medium specified by the mapping table, and not transferring write storage data indicated as invalid by the updated write state information from the buffer memory to the memory location in the non-volatile storage medium specified by the mapping table; and
wherein, in the read data operations, the memory controller is responsive to each read request received from the host system to read the read storage data from the non-volatile storage medium.

8. The computing system of claim 7, wherein the main memory of the host system includes a file system, and wherein the host system provides the invalidity information to the storage system based on the file system.

9. The computing system of claim 8, wherein the file system includes a file allocation table.

10. The computing system of claim 9, wherein the file allocation table includes a master boot record, a partition boot record, at least two file allocation tables, and a root directory.

11. The computing system of claim 7, wherein the invalidity information comprises at least one of an unwrite command, address information for the write storage data indicated as invalid, and size information of the write storage data indicated as invalid.

12. The storage system of claim 7, wherein the buffer memory is an input buffer memory, and wherein the storage system further comprises an output buffer memory which is separate from the input buffer memory.

* * * * *